United States Patent
Nagao et al.

(10) Patent No.: US 7,532,420 B2
(45) Date of Patent: May 12, 2009

(54) MASTER DISK FOR MAGNETIC TRANSFER, MAGNETIC RECORDING MEDIUM AND MAGNETIC RECORDING APPARATUS

(75) Inventors: Makoto Nagao, Odawara (JP); Minoru Araki, Odawara (JP); Satoshi Wakamatsu, Odawara (JP); Kenji Ichikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 241 days.

(21) Appl. No.: 11/312,556

(22) Filed: Dec. 21, 2005

(65) Prior Publication Data

US 2006/0158763 A1 Jul. 20, 2006

(30) Foreign Application Priority Data

Jan. 20, 2005 (JP) .............................. 2005-012878

(51) Int. Cl.
*G11B 5/86* (2006.01)
(52) U.S. Cl. .............................. 360/17; 360/16; 360/18
(58) Field of Classification Search ........................ None
See application file for complete search history.

(56) References Cited

U.S. PATENT DOCUMENTS

| 5,935,674 A * | 8/1999 | Saito et al. ............... 428/847.3 |
| 6,347,016 B1 * | 2/2002 | Ishida et al. .................. 360/17 |
| 7,193,796 B2 * | 3/2007 | Yasunaga ..................... 360/17 |
| 7,440,207 B2 * | 10/2008 | Nagao et al. ................... 360/17 |
| 2002/0063981 A1 * | 5/2002 | Hamada et al. ............... 360/16 |
| 2006/0154112 A1 * | 7/2006 | Bandic et al. ............... 428/828 |

FOREIGN PATENT DOCUMENTS

| JP | 2001266342 A | * | 9/2001 |
| JP | 2004-87099 A | | 3/2004 |

* cited by examiner

*Primary Examiner*—Andrea L Wellington
*Assistant Examiner*—Dismery E Mercedes
(74) *Attorney, Agent, or Firm*—Sughrue Mion, PLLC (57) ABSTRACT

The present invention provides a master disk for magnetic transfer which has a disk-like outer shape and in the surface of which a large number of fine magnetic layer patterns are formed, wherein the relationship between the outside diameter size d (mm) of the extreme outer circumference of the magnetic layer pattern and the master disk thickness t (mm) is given by $2.04 \times 10^{-3} \times d + 0.006 \leq t \leq 8.15 \times 10^{-3} \times d + 0.024$, in order to exclude the effects of bows, strains and thickness deviations of a master disk in performing magnetic transfer and ensure that accurate transfer of magnetization patterns can be performed.

3 Claims, 8 Drawing Sheets

| MASTER DISK DIAMETER (mm) | BIT FORMATION RADIUS (mm) | DISK THICKNESS t (mm) | | | | |
|---|---|---|---|---|---|---|
| | | LOWER LIMIT | UPPER LIMIT | MEDIUM | TOO THICK | TOO THIN |
| 21.6 | 5.0 | 0.050 | 0.200 | 0.1 | 0.270 | 0.020 |
| 48.0 | 10.0 | 0.104 | 0.415 | 0.27 | 0.550 | |
| 65.0 | 14.0 | 0.139 | 0.554 | | | 0.100 |
| 88.9 | 20.0 | 0.187 | 0.749 | 0.415 | 0.900 | |

FIG.8

MASTER DISK FOR MAGNETIC TRANSFER, MAGNETIC RECORDING MEDIUM AND MAGNETIC RECORDING APPARATUS

BACKGROUND OF THE INVENTION

1. Field of the Invention

The present invention relates to a master disk for magnetic transfer, a magnetic recording medium and a magnetic recording apparatus and, more particularly, to a master disk for magnetic transfer which is suitable for transferring magnetic information patterns of format information etc., to a magnetic disk used in a hard disk and the like, a magnetic recording medium to which magnetic information patterns have been magnetically transferred by the master disk, and a magnetic recording apparatus provided with the magnetic recording medium.

2. Description of the Related Art

In a magnetic disk (a hard disk), which is used in a hard disk drive which has rapidly come into wide use in recent years, it is general practice that format information and address information are written before the magnetic disk (the hard disk) is incorporated into the drive after delivery from a magnetic disk maker to a drive maker. Although this writing can also be performed by use of a magnetic head, it is efficient and desirable to perform collective transfer from a master disk in which these format information and address information are written.

In this magnetic transfer technology, a master disk and a disk targeted for transfer (a slave disk) are brought into close contact with each other, and in this condition, magnetic fields for transfer are applied by use of a magnetic field generating device, such as an electromagnet device and a permanent magnet device, disposed on one side or both sides, whereby magnetization patterns corresponding to information (for example, servo signals) which the master disk has are transferred.

In order to positively perform this magnetic transfer, it is required that the close contact condition between a master disk and a slave disk be made good and for this purpose, apparatus of various arrangements have hitherto been proposed (refer to the Japanese Patent Application Laid-Open No. 2004-87099, for example). The proposal of the Japanese Patent Application Laid-Open No. 2004-87099 relates to an apparatus which is such that master disks are held by a pair of holder units, a slave disk is supplied to between the pair of master disks by use of robot hands, and after that, magnetic fields for transfer are applied, with the master disks pressed against both surfaces of the slave disk and supported by being sandwiched.

SUMMARY OF THE INVENTION

However, even in a magnetic transfer method as described above, if bows, strains and thickness deviations are present in a master disk, it is impossible to make good the close contact condition between the master disk and the slave disk, thereby posing the problem that good magnetic transfer cannot be performed.

That is, a master disk is generally formed by transferring the surface shape of an original disk, on the surface of which fine concavo-convex patterns are formed, by electroforming. However, during electroforming, current density distribution and film stresses tend to occur and bows, strains and thickness deviations are often present in a completed master disk.

For this reason, in order to mitigate these defects, various measures are taken. For example, a buffer material (a cushion material) is disposed on the back surface of a master disk or the back surface of a master disk is machined to eliminate thickness deviations. However, these defects have not been completely solved by these measures.

The present invention has been made in view of such circumstances and has as its object the provision of a master disk for magnetic transfer which excludes the effects of bows, strains and thickness deviations of a master disk in performing magnetic transfer and ensures that accurate transfer of magnetization patterns can be performed, a magnetic recording medium to which magnetization patterns have been magnetically transferred by the master disk, and a magnetic recording apparatus provided with the magnetic recording medium.

To achieve the above object, the present invention provides a master disk for magnetic transfer which has a disk-like outer shape and in the surface of which a large number of fine magnetic layer patterns are formed. In the master disk for magnetic transfer, the relationship between the outside diameter size d (mm) of the extreme outer circumference of the magnetic layer patterns and the master disk thickness t (mm) is given by $2.04 \times 10^{-3} \times d + 0.006 \leq t \leq 8.15 \times 10^{-3} \times d + 0.024$.

According to the present invention, because the relationship between the outside diameter size d of the extreme outer circumference of the magnetic layer patterns and the master disk thickness t is in an appropriate range, the master disk is deformed during magnetic transformation so as to conform to the disk targeted for transfer (the slave disk). As a result of this, the effects of bows, strains and thickness deviations of the master disk are excluded and accurate transfer of magnetization patterns can be performed.

For this relationship between the outside diameter size d of the extreme outer circumference and the master disk thickness t, an appropriate range of the master disk thickness t is 50 to 200 μm in the case of a master disk for a slave disk having an outside diameter of 21.6 mm (nominal size: 0.85 inches), for example.

In the present invention, it is preferred that the magnetic layer patterns include a pattern of servo information. Also, in the present invention, it is preferred that the magnetic layer patterns are magnetic layer patterns which generate antiferromagnetic bonds.

Because a master disk having magnetic layers generating antiferromagnetic bonds permit high-density recording and has high thermal stability, it can display the effects of the present invention to a greater extent.

The present invention provides a magnetic recording medium which has been magnetically recorded by passing through a close contact step of bringing a magnetic recording medium targeted for transfer into close contact with a surface of the master disk for magnetic transfer, and a magnetic transfer step of providing a magnetic field generating device, applying a magnetic field in a circumferential direction of the magnetic recording medium targeted for transfer and the master disk, and transferring the magnetic patterns of the master disk to the magnetic recording medium targeted for transfer.

With such a master disk as described above, it is possible to make the condition of close contact with a slave disk good, magnetic transfer can be performed without a defect and with good accuracy, and a magnetic recording medium (a slave disk) having a good C/N ratio can be obtained.

Also, the present invention provides a magnetic recording apparatus provided with the above-described magnetic recording medium. When such a magnetic recording medium as described above is used, a magnetic recording apparatus (a hard disk drive and the like) having a good C/N ratio can be obtained.

As described above, according to the present invention, it is possible to compensate for strains and deformation due to bows and thickness deviations of a master disk, which occur when the master disk and a slave disk are brought into close contact with each other, and the condition of close contact between the master disk and the slave disk can be made good.

As a result of this, magnetic transfer can be performed without a defect and with good accuracy and a magnetic recording medium (a slave disk) having a good C/N ratio can be obtained.

DETAILED DESCRIPTION OF THE PREFERRED EMBODIMENTS

Figure 1:
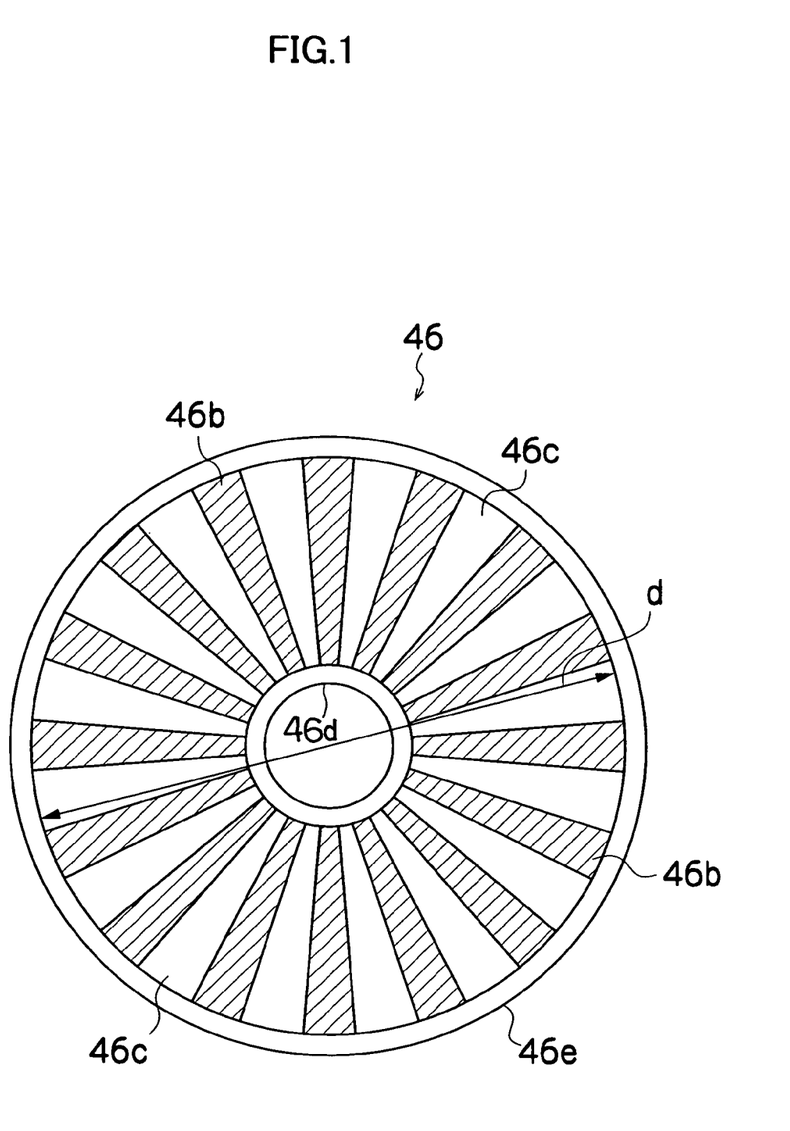
FIG. 1 is a plan view of a master disk for magnetic transfer related to the present invention.
Figure 2:
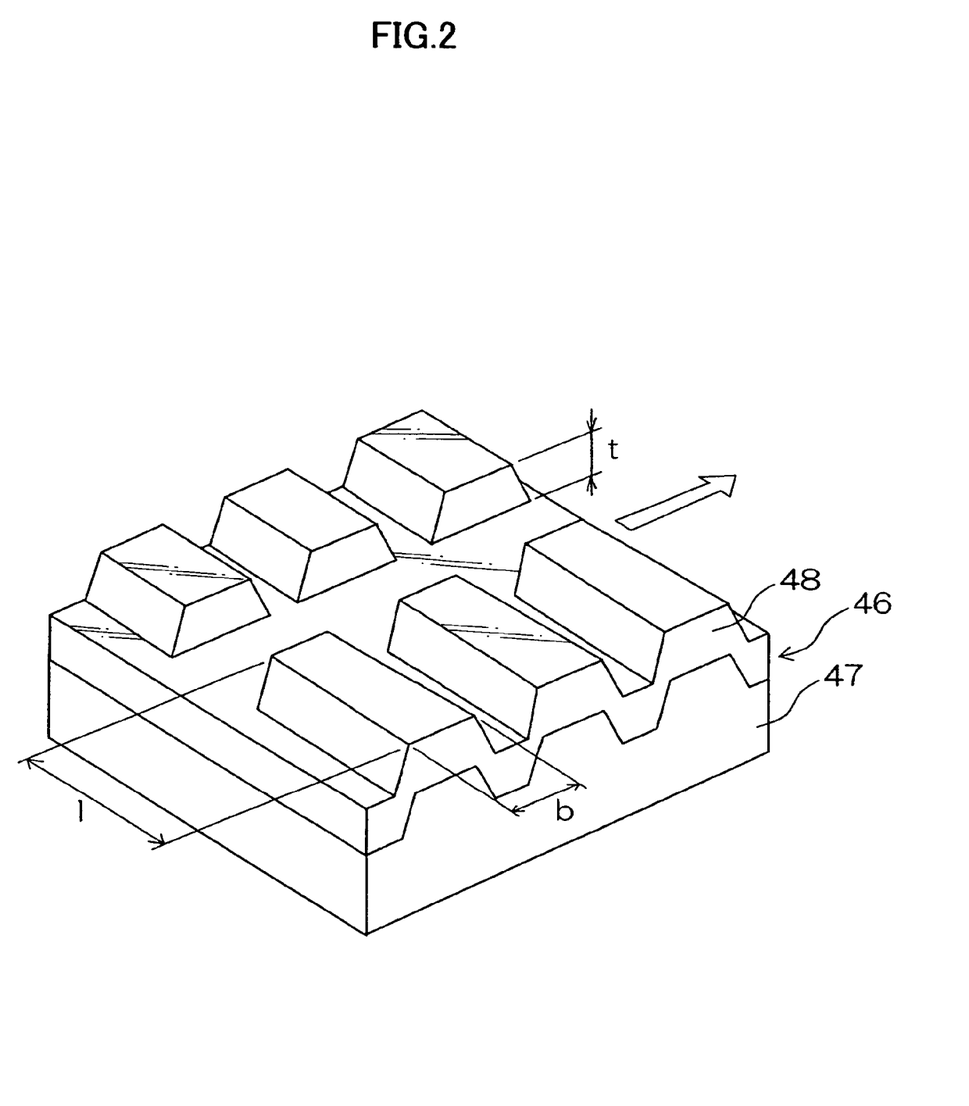
FIG. 2 is a partially enlarged perspective view which shows fine concavo-convex patterns on the surface of a master disk.

Hereinafter, a preferred embodiment (the first embodiment) of a master disk for magnetic transfer, a magnetic recording medium and a magnetic recording apparatus related to the present invention will be described with reference to the attached drawings. FIG. 1 is a plan view of a master disk for magnetic transfer related to the present invention. FIG. 2 is a partially enlarged perspective view which shows fine concavo-convex patterns on the surface of a master disk 46.

As shown in FIG. 1, the master disk 46 is formed in the shape of a disk, and hatched servo regions 46b and non-servo regions 46c (nonhatched parts) are alternately formed in the radially middle part of the master disk 46 (the part of the master disk 46 excluding an inner circumferential part 46d and an outer circumferential part 46e) in the circumferential direction.

The servo regions 46b are regions in which magnetic patterns (servo information patterns) are formed and the non-servo regions 46c are regions in which magnetic patterns (servo information patterns) are not formed.

The master disk 46 is formed in the shape of a circular ring (a donut) having an inside diameter. However, the master disk 46 may be in the shape of a disk without an inside diameter.

In the master disk 46, the relationship between the outside diameter size d (mm) of the servo region 46b, which is a magnetic layer pattern, and the master disk thickness t (mm) is given by $2.04 \times 10^{-3} \times d + 0.006 \leq t \leq = 8.15 \times 10^{-3} \times d + 0.024$.

Thus, the relationship between the outside diameter size d of the extreme outer circumference of the magnetic layer patterns and the master disk thickness t is in an appropriate range. Therefore, the master disk 46 is deformed during magnetic transformation so as to conform to the slave disk 40 (refer to FIG. 3 and FIGS. 5A, 5B and 5C). As a result of this, the effects of bows, strains and thickness deviations of the master disk 46 are excluded and accurate transfer of magnetization patterns can be performed.

For this relationship between the outside diameter size d and the master disk thickness t, an appropriate range of the master disk thickness t is 50 to 200 μm in the case of a master disk for a slave disk having an outside diameter of 21.6 mm (nominal size: 0.85 inches), for example.

If the master disk thickness t is less than 50 μm, the master disk is inferior in handling properties and deformation is apt to occur during handling. For this reason, the master disk is inferior in the close contact with a slave disk. Furthermore, reproducibility is also poor. On the other hand, if the master disk thickness t exceeds 200 μm, flexural rigidity becomes too large and the master disk is inferior in the close contact with a slave disk during magnetic transfer, although the master disk obtains good handling properties. Although the reason why an optimum range of the master disk thickness t exists is unclear, there is a strong possibility that the fact that flexural rigidity is proportional to a cubic of a radius produces such an effect.

Furthermore, for the relationship between the outside diameter size d and the master disk thickness t, an appropriate range of the master disk thickness t is 104 to 415 μm in the case of a master disk for a slave disk having an outside diameter of 48 mm (nominal size: 1.8 inches) and an appropriate range of the master disk thickness t is 139 to 554 μm in the case of a master disk for a slave disk having an outside diameter of 65 mm (nominal size: 2.5 inches).

FIG. 2 is a partially enlarged view of the servo region 46b. A transfer information carrying surface, on which fine protruding patterns by magnetic layers 48 are formed, is formed on one surface of a substrate 47 and the opposite surface of the substrate 47 is held by a close contacting device which is not shown. The formation of the fine protruding patterns is performed by a photofabrication process, which will be described later, and the like. One surface (the transfer information carrying surface) of the master disk 46 is a surface which is brought into close contact with a slave disk 40.

The fine protruding patterns are rectangular as plan viewed and, with the magnetic layers 48 having a thickness t formed, each protrusion is composed of a length b in the direction of tracks (the direction of the thick arrow in the figure) and a radial length 1. Although optimum values of the length b and the length 1 differ depending on recording density, the waveform of a recording signal, etc., it is possible to set the length b at 80 nm and the length 1 at 200 nm, for example.

The fine protruding pattern is formed to be radially elongated in the case of a servo signal. In this case, it is preferred that the radial length 1 be 30 to 200 nm and that the length in the direction of tracks (the circumferential length) be 0.02 to 1 μm. It is preferred that a pattern which is radially long in these ranges be selected as a pattern which carries the information of a servo signal.

The depth of the fine protruding patterns (the height of the protrusions) on the surface of the substrate 27 is preferably in the range of 30 to 800 nm, and more preferably in the range of 100 to 600 nm.

In the master disk 46, magnetic transfer is possible with the substrate 47 alone when the substrate 47 is formed from a ferromagnetic material mainly composed of Ni etc., and hence the magnetic later 48 does not always require coating. However, better magnetic transfer can be performed by providing a magnetic layer 48 having good transfer properties. When the substrate 47 is formed from a nonmagnetic material, it is necessary to provide the magnetic layer 48. It is preferred that the magnetic layer 48 of the master disk 46 be a soft magnetic layer having a coercive force Hc of not more than 48 kA/m (≈600 Oe).

Nickel, silicon, glasses of various compositions, such as quartz glass, aluminum, alloys, ceramics of various compositions, synthetic resins, etc. can be used as materials for the substrate 47 of the master disk 46. The formation of the concavo-convex patterns on the surface of the substrate 47 can be performed by the photofabrication process, the stamper process by use of an original disk formed by the photofabrication process etc., and the like.

For example, the formation of an original disk in the stamper process can be performed as follows. A photoresist layer is formed by the spin coat process etc. on a glass plate (or a quartz glass plate or a silicon plate) having a smooth surface, a laser beam (or an electron beam) which has been modulated to respond to a servo signal is radiated after prebaking while the glass plate is being rotated, and on substantially the whole surface of the photoresist layer, a prescribed pattern, for example, a pattern corresponding to a servo signal which extends linearly in the radial direction in each track from the center of rotation is exposed in portions corresponding to each frame on the circumference.

After that, the photoresist layer is subjected to development treatment, whereby an original disk of glass is obtained, the original disk of glass having concavo-convex patterns which are formed by the photoresist layer, from which the exposed portions are removed. Subsequently, on the basis of the concavo-convex patterns on the surface of the original disk of glass, the surface is plated (electroformed) to a prescribed thickness, whereby a Ni substrate having positive concavo-convex patterns on the surface is prepared. And the substrate is exfoliated from the original disk of glass.

The substrate is used as an original disk without any further treatment or the substrate is used as an original disk after coating the concavo-convex patterns with a soft magnetic layer, a protective layer, etc. as required.

Or alternatively, a second original disk is prepared by electroforming, which involves plating an original disk of glass, and the second original disk is further plated, whereby a reverse original disk having negative concavo-convex patterns may be prepared by electroforming. Furthermore, a third original disk is prepared either by electroforming the second original disk by plating or by pushing a low-viscosity resin against the second original disk and hardening the resin and the third original disk is electroformed by plating, whereby a substrate having positive concavo-convex patterns may be prepared.

Ni or Ni alloys can be used as metal materials for the substrate. Electroless plating, electroforming, sputtering, various kinds of metal film formation processes including ionplating, etc. can be applied as plating methods for preparing the substrate.

The magnetic layer 48 (soft magnetic layer) is formed from a magnetic material by use of vacuum film formation processes, such as the vacuum evaporation process, the sputtering process and the ionplating process, the plating process, etc. As magnetic materials for the magnetic layer 48, it is possible to use Co, Co alloys (CoNi, CoNiZr, CoNbTaZr, etc.), Fe, Fe alloys (FeCo, FeCoNi, FeNiMo, FeAlSi, FeAl, FeTaN, Ni, and Ni alloys (NiFe). In particular, FeCo and FeCoNi can be advantageously used. The thickness t of the magnetic layer 48 is preferably in the range of 50 nm to 500 nm, and more preferably in the range of 100 nm to 400 nm.

Incidentally, it is preferred that a carbon film, particularly, a protective film of diamond-like carbon etc. be provided on the magnetic layer 48, and a lubricant layer may be further provided on a protective layer. In this case, a preferred film construction is a diamond-like carbon film having a thickness of 3 to 30 nm as a protective film plus a lubricant film. Also, an adhesion enforcing layer of Si etc. may be provided between the magnetic layer 48 and a protective layer. A lubricant is effective in improving the deterioration of durability, such as the occurrence of flaws due to friction during the correction of misalignment which occurs in the process of contact with the slave disk 40.

The master disk 46 may be formed by fabricating a resin substrate by use of the above-described original disk and providing a magnetic layer on the surface of the resin substrate. As resin materials for the resin substrate, it is possible to use acrylic resins, such as polycarbonate and polymethylmethacrylate, vinyl chloride resins, such as polyvinyl chloride and vinyl chloride copolymer, epoxy resins, amorphous polyolefin, polyester, etc.

Among these, polycarbonate is preferable in terms of moisture resistance, dimensional stability, price, etc. When there are burrs in formed products, the burrs are removed by burnishing or polishing. Also, the master disk 46 may be formed by applying a spin coat, a bar coat, etc. to an original disk by use of ultraviolet curing resins, electron beam curing resins, etc. The height of pattern protrusions of a resin substrate is preferably in the range of 50 to 1000 nm, and more preferably in the range of 100 to 500 nm.

The master disk 46 is obtained by coating the fine patterns on the surface of the resin substrate with the magnetic layer 48. The magnetic layer 48 is formed from a magnetic material by use of vacuum film formation processes, such as the vacuum evaporation process, the sputtering process and the ionplating process, the plating process, etc.

On the other hand, the photofabrication process, which is one kind of methods of forming the master disk 46, is performed by following the procedure below. First, a photoresist is applied to a smooth surface of, for example, a flat-plate-like substrate, and a pattern corresponding to information is formed by exposure and development treatment by use of a photomask corresponding to the pattern of a servo signal.

Subsequently, the etching of the substrate is performed according to the pattern in the etching step, whereby a hole having a depth equivalent to the thickness of the magnetic layer 48 is formed. Subsequently, by use of vacuum film formation processes, such as the vacuum evaporation process, the sputtering process and the ionplating process, the plating process, etc., a film of a magnetic material is formed in a thickness corresponding to the formed hole up to the surface of the substrate.

Subsequently, the photoresist is removed by the lift-off process, the surface is polished, burrs are removed, if present, and the surface is made smooth.

Figure 3:
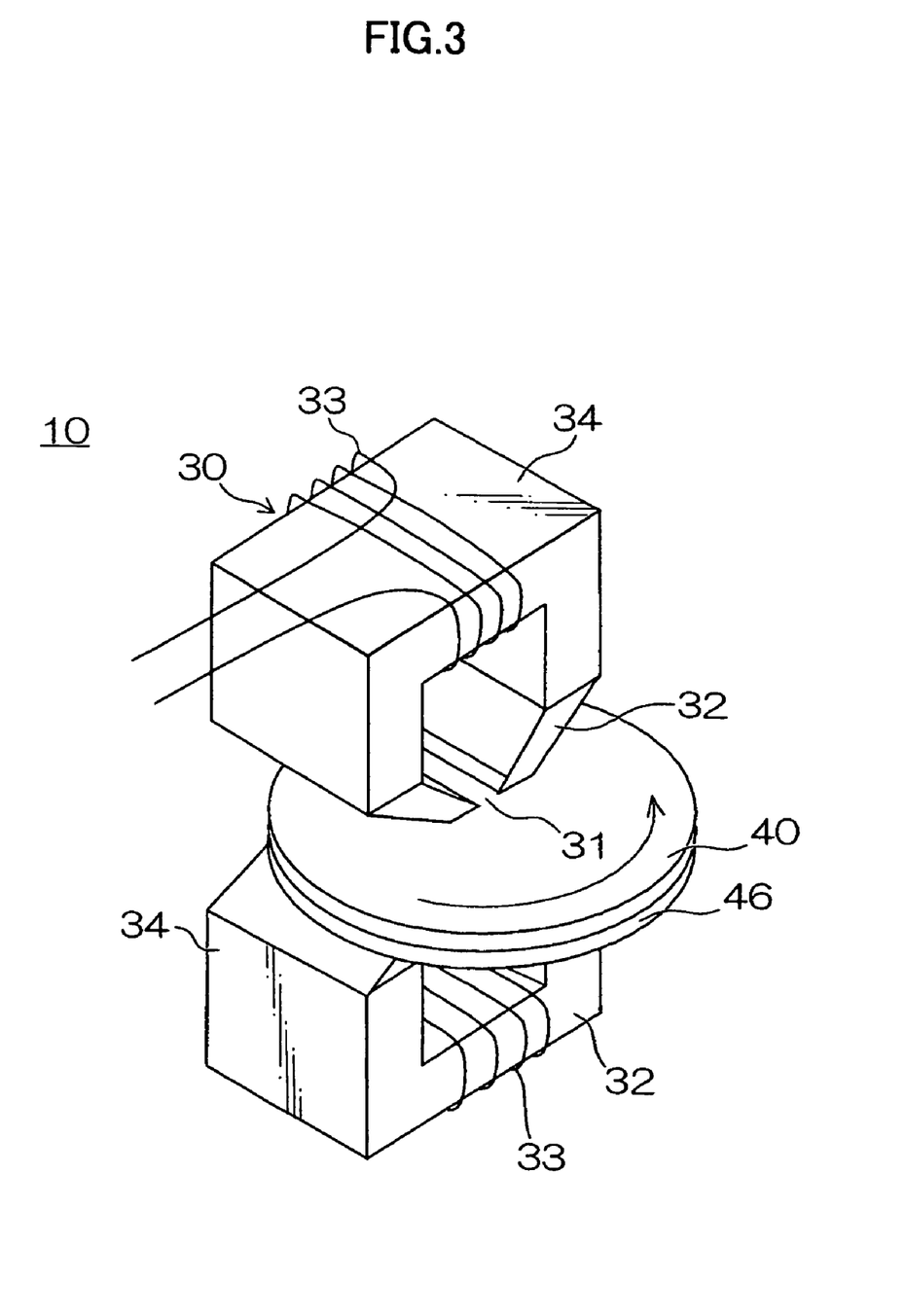
FIG. 3 is a partial perspective view of a magnetic transfer apparatus for carrying out a magnetic transfer method.

Next, a magnetic transfer method for transferring the magnetic layer patterns of the master disk 46 to a disk targeted for transfer (a slave disk) will be described. FIG. 3 is a partial perspective view of a magnetic transfer apparatus 10 for carrying out magnetic transfer by use of the master disk 46 related to the present invention.

In the magnetic transfer apparatus 10, it is ensured during magnetic transfer that a slave surface (a magnetic recording surface) of the slave disk (the disk targeted for transfer) 40 after the initial DC magnetization of FIG. 5A, which will be described later, can be brought into contact with the information carrying surface of the master disk 46 and then brought into close contact with a prescribed depressing force. And it is ensured that with the slave disk 40 and the master disk 46 kept in a close contact condition, magnetization patterns of servo signal etc. can be transferred and recorded by applying magnetic fields for transfer by use of a magnetic field generating device 30.

Next, the slave disk 40 will be described. The slave disk 40 is a magnetic recording medium in the shape of a disk, such as a hard disk and a flexible disk on both surfaces or one surface of which magnetic recording layers are formed, and before being brought into close contact with the master disk 46, the slave disk 40 is subjected to cleaning treatment (burnishing etc.) as required to remove very minute protrusions or adhering dust on the surface by use of a glide head, an abrasive object, etc. Also, the slave disk 40 is subjected to initial magnetization beforehand. Details of the initial magnetization will be given later.

As the slave disk 40, magnetic recording media in the shape of a disk, such as a hard disk and a high density flexible disk, can be used. As the magnetic recording layer of the slave disk 40, it is possible to adopt an application type magnetic recording layer, a plating type magnetic recording layer or a magnetic recording layer of thin metal film type.

As magnetic materials for the magnetic recording layer of thin metal film type, it is possible to use Co, Co alloys (CoPtCr, CoCr, CoPtCrTa, CoPtCrNbTa, CoCrB, CoNi, etc.) Fe, and Fe alloys (FeCO, FePt, FeCoNi). These permit clear transfer and -hence are preferable, because they have large magnetic flux densities and magnetic anisotropy in the same direction as the direction of magnetic field application (the in-plane direction in the case of in-plane recording).

To impart necessary magnetic anisotropy to under the magnetic material (the support medium side), it is preferable to provide a nonmagnetic base layer. It is necessary that the crystal structure and lattice constant of the base layer be adapted to the magnetic layer 48. For this purpose, it is preferable to use Cr, CrTi, CoCr, CrTa, CrMo, NiAl, Ru, etc.

There are two methods of performing magnetic transfer by use of the master disk 46. In one method, as shown in FIG. 3, with the master disk 46 in close contact with one surface of the slave disk 40, transfer is sequentially performed on one surface and in the other method, with the master disks 46, 46 in close contact with both surfaces of the slave disk 40, simultaneous transfer is performed on both surfaces. Incidentally, before the master disk 46 is brought into close contact with the slave disk 40, the master disk 46 is subjected to cleaning treatment as required to remove adhering dust.

Figure 4:
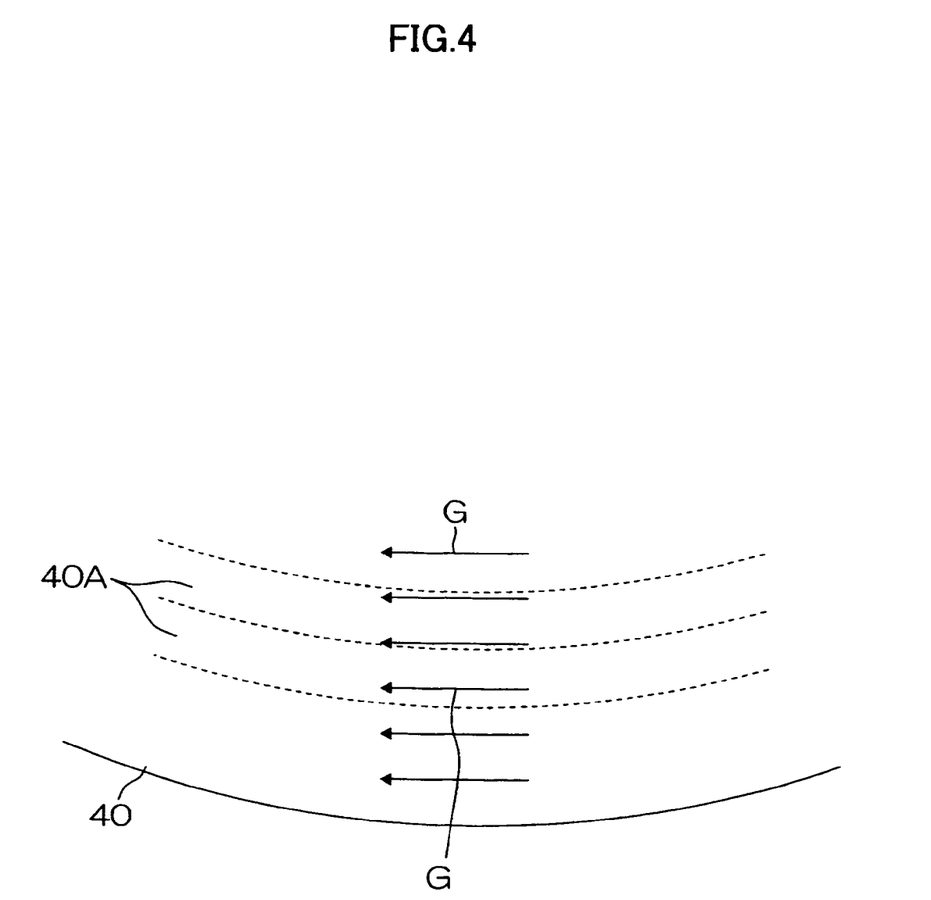
FIG. 4 is a plan view which shows a method of applying magnetic fields for transfer.

The magnetic field generating device 30 which applies magnetic fields for transfer is constituted by electromagnet devices 34, 34, which are disposed on both top and bottom sides so that magnetic fields for transfer having lines of magnetic force G (refer to FIG. 4) parallel to the direction of tracks can be applied in the same direction on the top and bottom sides. In each of the electromagnet devices 34, 34, a coil 33 is wound around a core 32 which has a gap 31 extending in the direction of the radius of the slave disk 40 and master disk 46 held by a close contacting device. FIG. 4 is a plan view which shows a method of applying magnetic fields for transfer, and shows the relationship between circumferential tracks 40A, 40A . . . and lines of magnetic force G, G . . . .

In applying magnetic fields, a rotary device is provided so that magnetic fields for transfer can be applied by the magnetic field generating device 30 while the slave disk 40 and the master disk 46 are being rotated as one piece and the transfer information of the master disk 46 can be magnetically transferred and recorded on the slave surface of the slave disk 40. Incidentally, in addition to this arrangement, it is also possible to adopt an arrangement in which the magnetic field generating device 30 is provided so as to be rotationally moved.

It is preferred that magnetic fields for transfer have a coercive force Hc in the range of 0.6 to 1.3 times the coercive force Hc of the slave disk 40.

Next, a magnetic transfer method by the magnetic transfer apparatus 10 constructed as described above will be described.

Figure 5A:
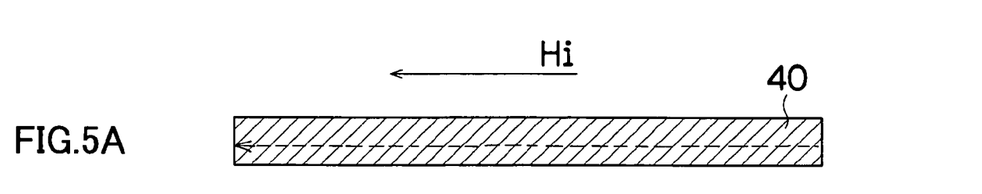
FIGS. 5A, 5B and 5C are each a diagram which shows basic steps of a magnetic transfer method.
Figures 5B, 5C:
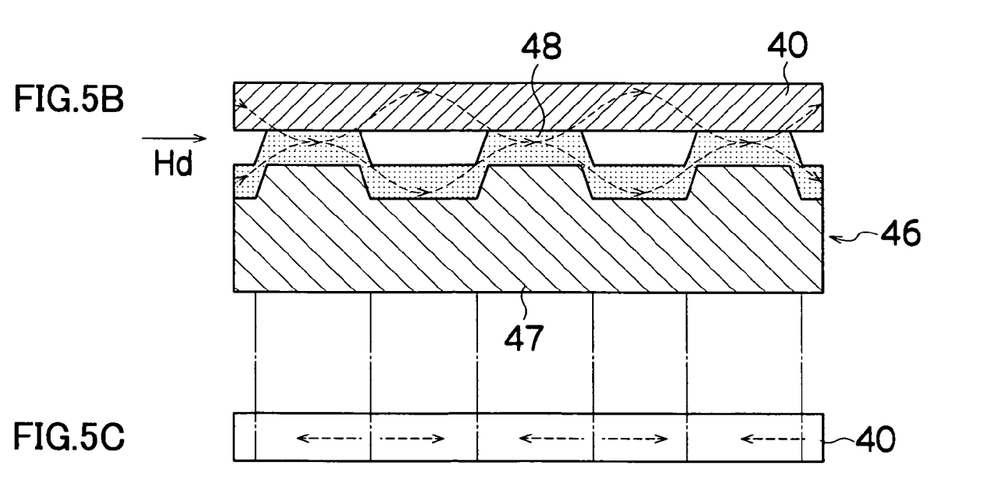
Figure 6:
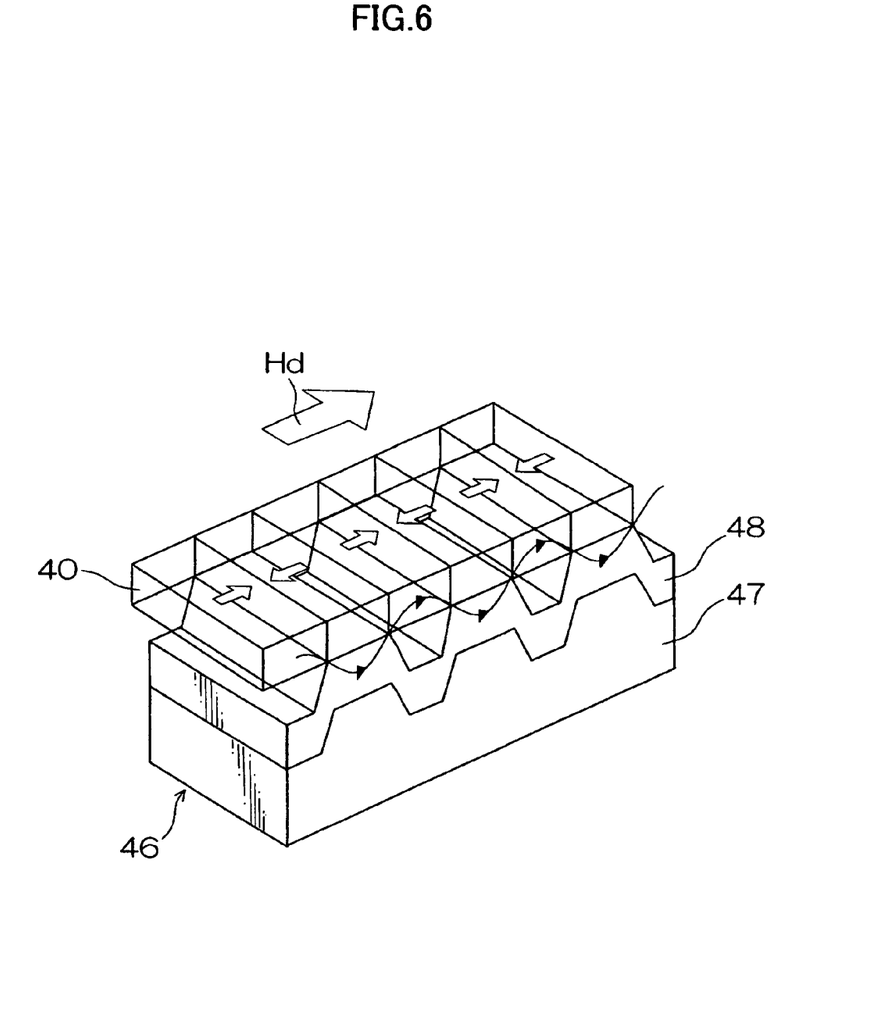
FIG. 6 is a perspective view to explain the condition of magnetic transfer in FIG. 5B.

FIGS. 5A, 5B and 5C are each a diagram which shows basic steps of the magnetic transfer method. FIG. 5A shows the step of initial DC magnetization of the slave disk 40 by applying a magnetic field in one direction, FIG. 5B shows the step of applying magnetic fields in the opposite direction, with the master disk 46 and the slave disk 40 kept in close contact with each other, and FIG. 5C shows the condition after magnetic transfer. FIG. 6 is a perspective view to explain the condition of magnetic transfer in FIG. 5B. Incidentally, each of the drawings is a schematic view and the size of each part is shown at a ratio different from an actual one.

First, as shown in FIG. 5A, initial magnetization (DC demagnetization) is performed by applying an initial magnetic field Hi to the slave disk 40 in one direction which is the direction of tracks (the circumferential direction). The magnetic field Hi of this initial magnetization has preferably a coercive force Hc which is not less than the coercive force Hc of the slave disk 40 and more preferably a coercive force Hc which is not less than twice the coercive force Hc of the slave disk 40.

Subsequently, as shown in FIGS. 5B and 6, the slave surface (magnetic recording surface) of the slave disk 40 is brought into close contact with the information carrying surface, which is formed by coating the concavo-convex patterns of the substrate 47 of the master disk 46 with the magnetic layers 48, and magnetic fields for transfer Hd are applied in the direction of tracks of the slave disk 40, in the direction reverse to the direction of the initial magnetic field Hi, whereby magnetic transfer is performed.

In the case of a conventional master disk, if strains and deformation due to bows and thickness deviations occur in the master disk, then it is difficult to ensure the close contact between the slave disk 40 and the master disk 46 when the slave disk 40 and the master disk 46 are to be brought into close contact with each other.

That is, if the thickness of the master disk is large, rigidity is high and hence it is difficult for the master disk to conform to the shape of the slave disk, with the result that the close contact between the slave disk 40 and the master disk cannot be locally ensured. As a result, signal dropouts due to poor transfer and deterioration due to PES (positive error signal) occur.

In contrast, with the master disk 46 of the present invention, because of an appropriate disk thickness t, the close contact condition between the master disk 46 and the slave disk 40 can be made good even when strains and deformation due to bends and thickness deviations of the master disk 46 occur.

As a result of magnetic transfer, as shown in FIG. 5C, magnetization patterns corresponding to the formation patterns of the convexities in close contact and concave spaces of the magnetic layer 48 on the information carrying surface of the master disk 46 are transferred and recorded on the slave surface (track) of the slave disk 40.

Incidentally, even in a case where the concavo-convex patterns of the substrate 47 of the master disk 46 are negative patterns of concavo-convex shape reverse to the positive patterns of FIG. 5C, similar magnetization patterns can be transferred and recorded by reversing the direction of the initial magnetic field Hi and the direction of the magnetic fields for transfer Hd.

The slave disk 40 for which magnetic transfer has been carried out can be advantageously used by being incorporated in a magnetic recording apparatus (a hard disk drive). As the hard disk drive used for the slave disk 40, various kinds of publicly known apparatus marketed by drive makers can be used.

The embodiment of a master disk for magnetic transfer, a magnetic recording medium and a magnetic recording apparatus related to the present invention has been described above. However, the present invention is not limited to the above embodiment and various embodiments can be adopted.

For example, in this embodiment, the back surface of the master disk 46 is not worked. However, it is possible to adopt an embodiment in which the back surface of the master disk 46 is machined to eliminate thickness deviations.

Also, as described above, the master disk 46 is formed in the shape of a circular ring (a donut) with an inside diameter. However, the master disk 46 may be formed in the shape of a disk without an inside diameter.

Furthermore, in the above embodiment, magnetic transfer is performed to the slave disk 40 by use of the magnetic field generating device 30 while the slave disk 40 (also the master disk 46 in close contact) is continuously rotated. However, it is possible to adopt an arrangement in which after magnetic fields are applied to the slave disk 40 and the master disk 46 in the circumferential direction through one full circle or more, the intensity of the magnetic fields is reduced to a prescribed value and thereafter the rotation of the slave disk 40 and the master disk 46 is stopped.

If in this manner, after transfer in the circumferential direction through one full circle, the intensity of the magnetic fields is reduced to a specified value and the rotation is thereafter stopped, the effect on transfer accuracy becomes very small and the C/N ratio of regenerative signals is improved.

Master disks 46 having combinations of various outside diameter sizes d and various thicknesses t were fabricated under the conditions, which will be described below, magnetic transfer was performed to the slave disk 40 by use of the magnetic field generating device 30, and the modulation of regenerative signals of the slave disk 40 after the transfer under each of the conditions was evaluated.

The master disks 46 were fabricated by the Ni stamper process. In these master disks 46, fine protruding patterns as shown in FIG. 2 were formed in the position (the bit formation radius) shown in the table of FIG. 7. The size of the fine protruding patterns was such that the length b in the direction of tracks was 100 nm and the radial length 1 was 200 nm.

After a pressure reduction to $1.33 \times 10^{-5}$ Pa ($10^{-7}$ torr) at room temperature by use of a vacuum film forming apparatus, a pressure of 0.4 Pa ($3 \times 10^{-3}$ torr) was obtained by introducing argon gas, and an FeCo film (a soft magnetic film) having a thickness of 200 nm was formed on an Ni substrate under the conditions, thereby to obtain a master disk 46. The coercive force Hc of the master disk 46 was 8 kA/m (100 Oe) and its magnetic flux density Ms was 2.2 T (22000 gauss).

A glass hard disk of thin film was used as a slave disk 40. After a pressure reduction to $1.33 \times 10^{-5}$ Pa ($10^{-7}$ torr) at room temperature by use of a vacuum film forming apparatus, a pressure of 0.4 Pa ($3 \times 10^{-3}$ torr) was obtained by introducing argon gas, and a glass plate was heated to 200° C. under the conditions, whereby hard disks of various outside diameter sizes having a CrTi film thickness of 60 nm and a CoCrPt film thickness of 25 nm with a magnetic flux density Ms of 5.7 T (4500 gauss) and a coercive force Hc of 199 kA/m (2500 Oe) were fabricated.

Magnetic transfer was performed by use of the arrangement shown in FIG. 3 and according to the flow shown in FIGS. 5A, 5B and 5C. First, the electromagnet device 34 with a ring-shaped head was arranged so that the peak intensity of magnetic fields on the surface of the slave disk 40 became 398 kA/m (5000 Oe), twice as large as the coercive force Hc of the slave disk 40, and initial DC magnetization of the slave disk 40 was performed.

Next, the slave disk 40 for which the initial DC magnetization had been completed was brought into close contact with the master disk 46, and the current of the electromagnet device 34 was adjusted so that the peak intensity of magnetic fields on the surface of the slave disk 40 became 207 kA/m (2600 Oe).

At this time, the slave disk 40 and the master disk 46 in a close contact condition were moved, and magnetic transfer was performed by use of the electromagnet device 34 by applying magnetic fields for transfer in the direction reverse to the direction of initial DC magnetization. Incidentally, in bringing the slave disk 40 into close contact with the master disk 46, pressure was applied from above an aluminum plate, with a rubber plate sandwiched.

An evaluation of transfer signals of the slave disk 40 was performed by use of an electromagnetic conversion characteristics measuring device (made by Kyodo Denshi System Co., Ltd.). An MR head having a read head gap of 0.24 µm, a read track width of 1.9 µm, a record head gap of 0.4 µm and a record track width of 2.4 µm was used as the head. The modulation $(V_{MAX}-V_{MIN})/(V_{MAX}+V_{MIN})$ of regenerative signals through one full circle after transfer was measured.

Figure 7:
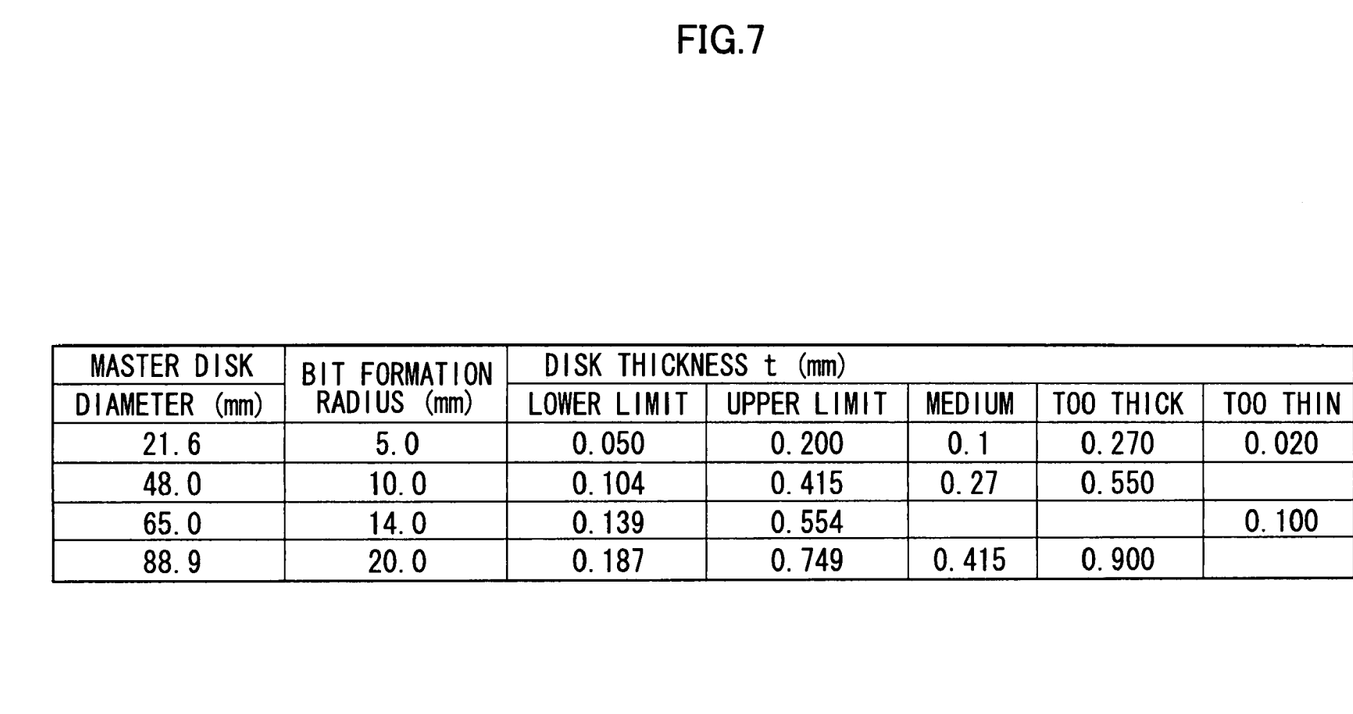
FIG. 7 is a table which shows the conditions for the embodiment.
Figure 8:
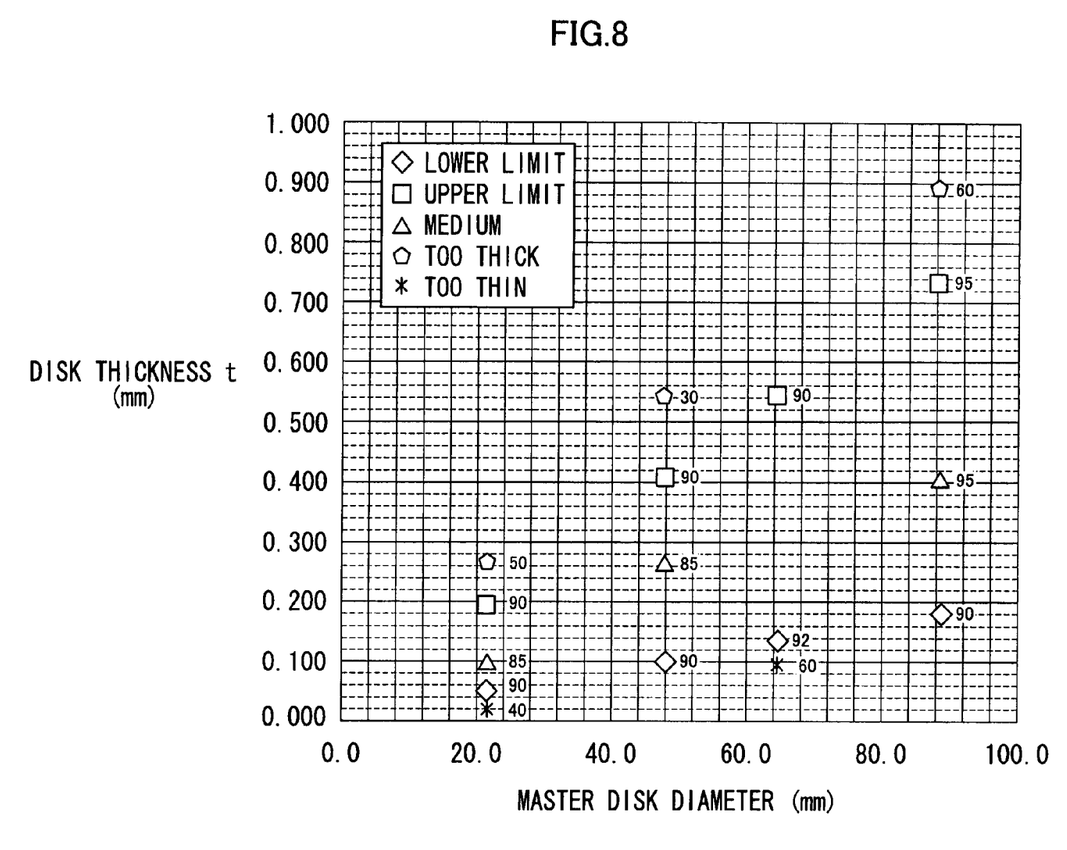
FIG. 8 is a graph which shows the results of the embodiment.

The conditions for the embodiment are shown in the table of FIG. 7 and the results of the embodiment are shown in the graph of FIG. 8. The values of disk thickness t in the table of FIG. 7 are classified into five kinds of "lower limit," "upper limit," "medium," "too thick," and "too thin" of sizes corresponding to the outside diameter sizes of the master disk 46.

In the graph of FIG. 8, the diameter (mm) of the master disk 46 is taken as abscissa and the disk thickness t (mm) of the master disk 46 is taken as ordinate. In this graph, the numerical values on the right side of each point indicate the results of measurement of the slave disk 40 for which magnetic transfer was performed by use of the master disk 46 of each size (modulation $(V_{MAX}-V_{MIN})/(V_{MAX}+V_{MIN})$).

It can be read that all results of the modulation $(V_{MAX}-V_{MIN})/(V_{MAX}+V_{MIN})$ in an optimum range specified in the present invention show good values, whereas the results of the modulation $(V_{MAX}-V_{MIN})/(V_{MAX}+V_{MIN})$ in other ranges are inferior. As a result of this, the effect of the present invention could be ascertained.

Incidentally, good tracking characteristics were obtained when the above-described slave disk 40 in the scope of the present invention was incorporated in a magnetic recording apparatus (a hard disk drive) marketed by a drive maker (by replacing an existing hard disk) and tracking characteristics were evaluated.

What is claimed is:

1. A method of designing a master disk for magnetic transfer which has a disk-like outer shape and in the surface of which a large number of fine magnetic layer patterns are formed, wherein outside diameter size d (mm) of the extreme outer circumference of the magnetic layer pattern and the master disk thickness t (mm) are in a relationship where a value of t depends upon a value of d, wherein the value of t increases as the value of d increases, and wherein a lower limit for a range values of t is $2.04 \times 10^{-3} \times d + 0.006$ and an upper limit for the range is $8.15 \times 10^{-3} \times d + 0.024$, so that the master disk thickness t is designed in accordance with the value of d.

2. The method of claim 1, wherein at least one of Nickel (Ni) or a Nickel containing alloy is used to form the substrate of the master disk.

3. The method of claim 1, wherein the outside diameter size of the master disk is larger than 21.6 mm and smaller than 88.9 mm.

* * * * *